(12) United States Patent  
Sankar

(10) Patent No.: US 8,282,339 B2  
(45) Date of Patent: Oct. 9, 2012

(54) VERTICAL AXIS TURBINE

(76) Inventor: Terrence C. Sankar, Coraopolis, PA (US)

( * ) Notice: Subject to any disclaimer, the term of this patent is extended or adjusted under 35 U.S.C. 154(b) by 581 days.

(21) Appl. No.: 12/335,098

(22) Filed: Dec. 15, 2008

(65) Prior Publication Data

US 2009/0155074 A1    Jun. 18, 2009

Related U.S. Application Data

(60) Provisional application No. 61/007,579, filed on Dec. 14, 2007.

(51) Int. Cl.  
*F03D 7/00* (2006.01)

(52) U.S. Cl. .............................. 415/4.4; 415/907; 416/44
(58) Field of Classification Search ............ 416/197 A, 416/197 R, 197 B, 197 C, 90 R, 91, 92, 202, 416/203, 44; 415/115, 143, 907, 913, 4.2, 415/4.4

See application file for complete search history.

(56) References Cited

U.S. PATENT DOCUMENTS

| | | | |
|---|---|---|---|
| 4,005,947 A * | 2/1977 | Norton et al. ............. | 416/197 A |
| 5,664,418 A * | 9/1997 | Walters ............................ | 60/398 |
| 7,008,171 B1 * | 3/2006 | Whitworth ..................... | 415/4.2 |

* cited by examiner

*Primary Examiner* — Ross Gushi  
(74) *Attorney, Agent, or Firm* — Spilman Thomas & Battle, PLLC

(57) ABSTRACT

Turbine systems and apparatuses and methods for operating a turbine. The turbine has a shaft coupled to a generator and a segment and the segment has an asymmetric shaped wall.

18 Claims, 24 Drawing Sheets

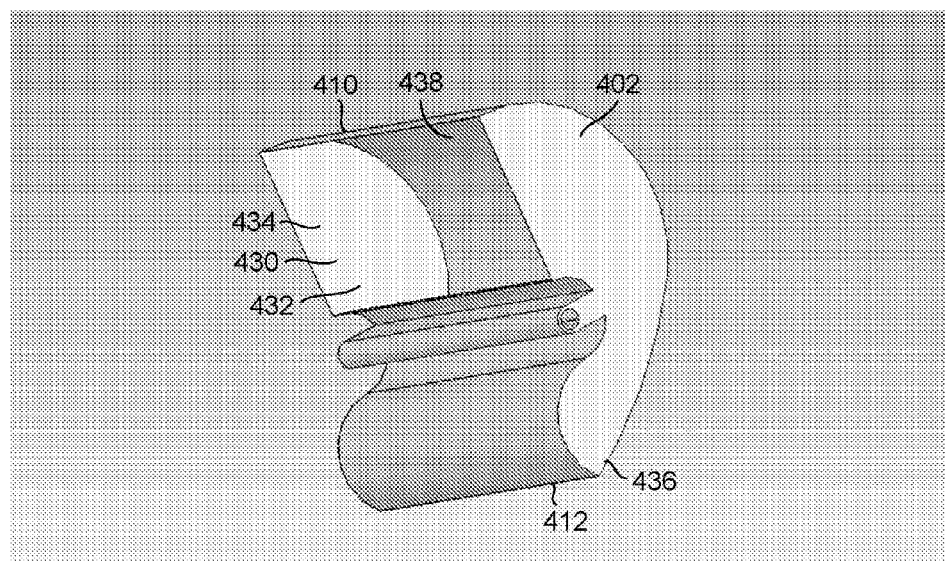
Figure 6: Perspective outline view of section of turbine.

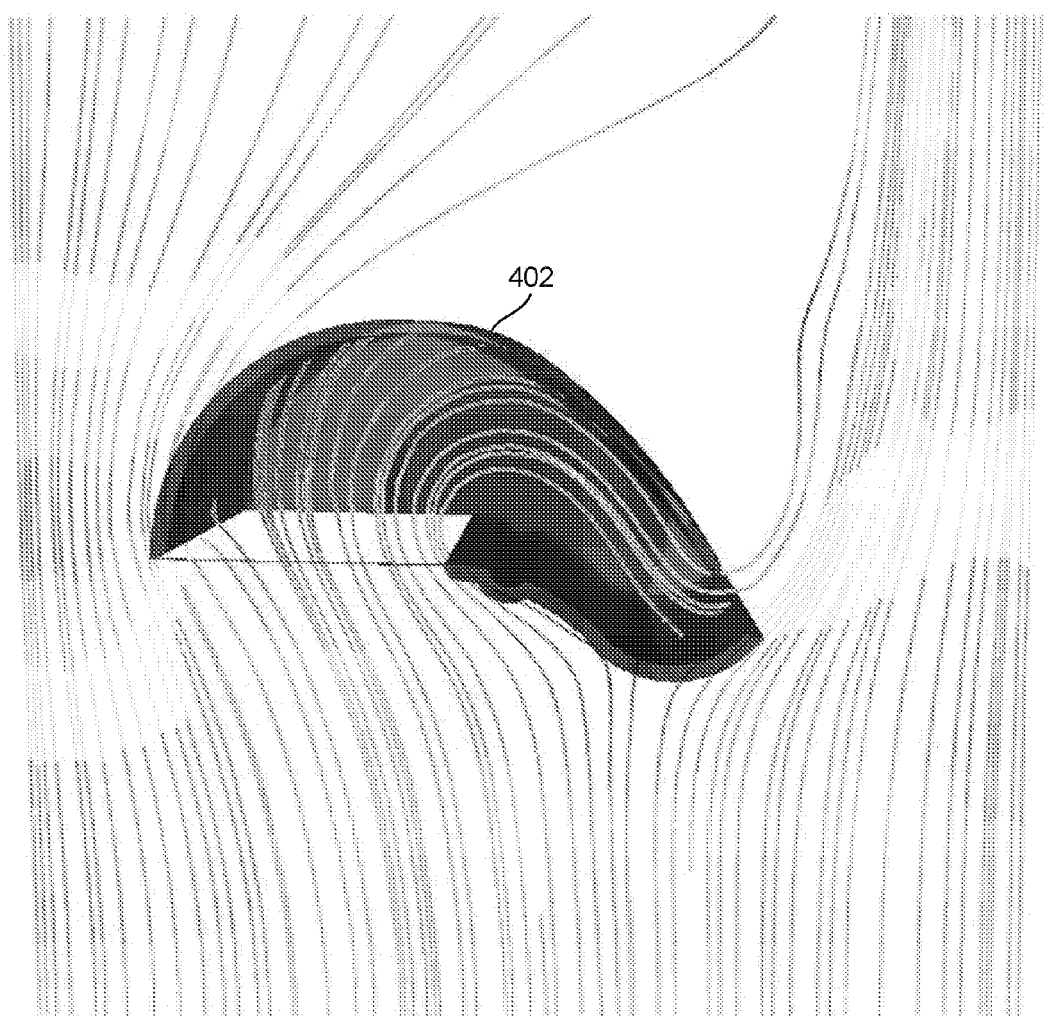
Figure 7: The flow of air through a section of the turbine showing the compression of air in the large intake opening and jet of accelerated air leaving the exit opening.

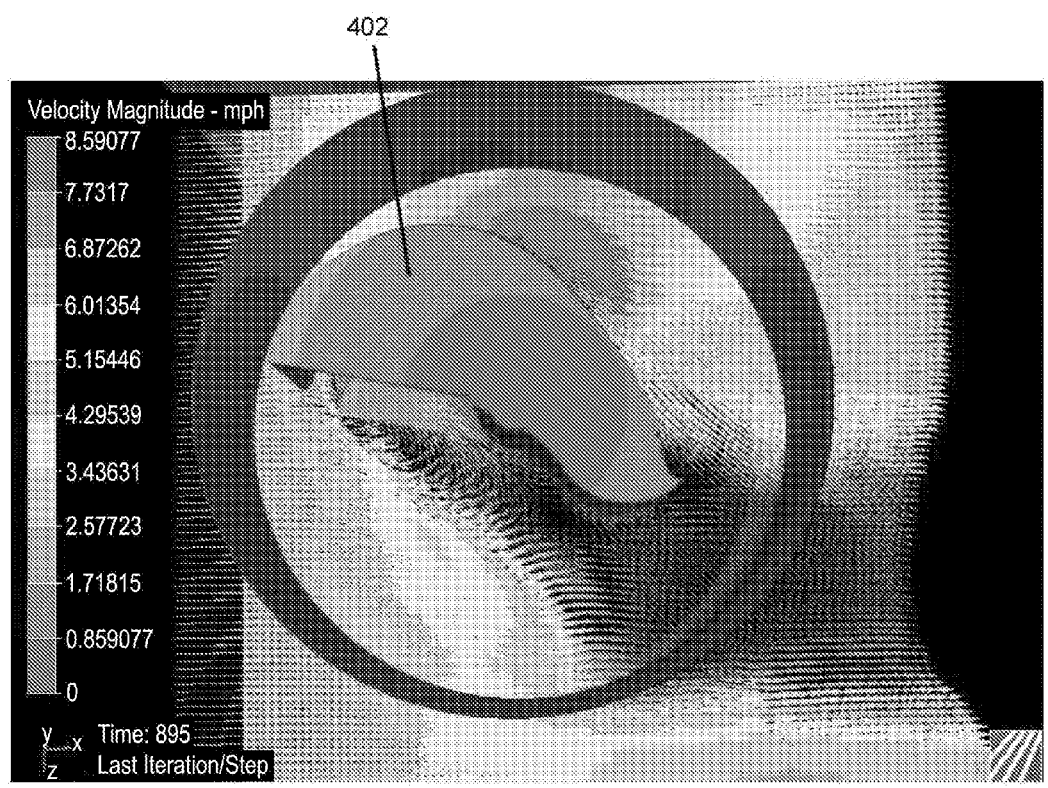
Figure 8: Top view of turbine section.

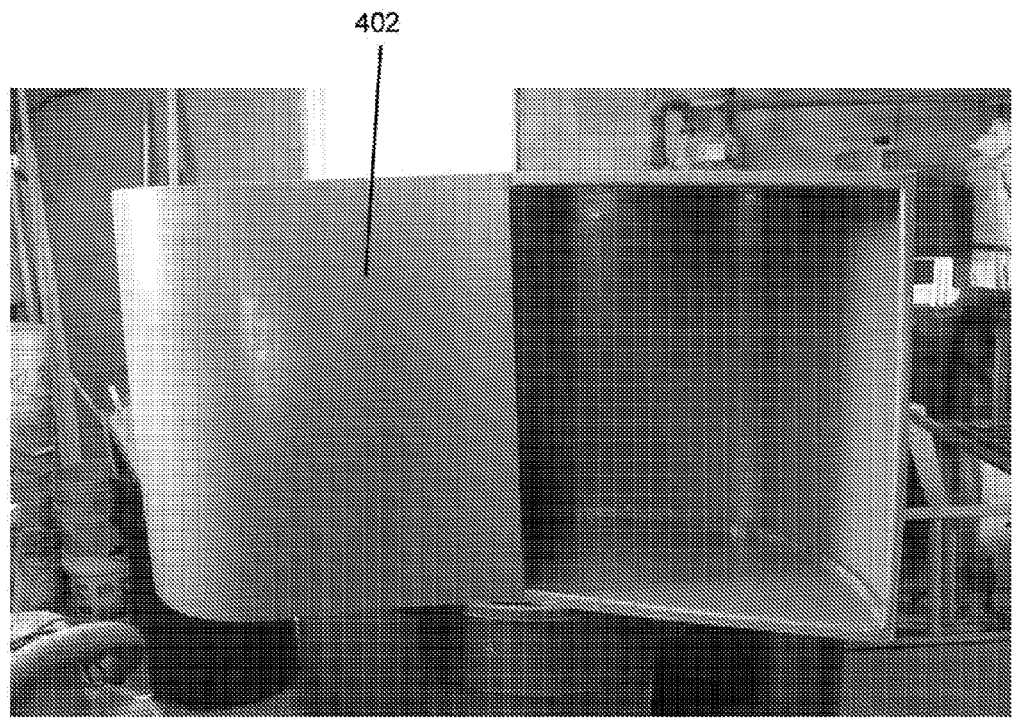
Figure 9: Front view of turbine section.

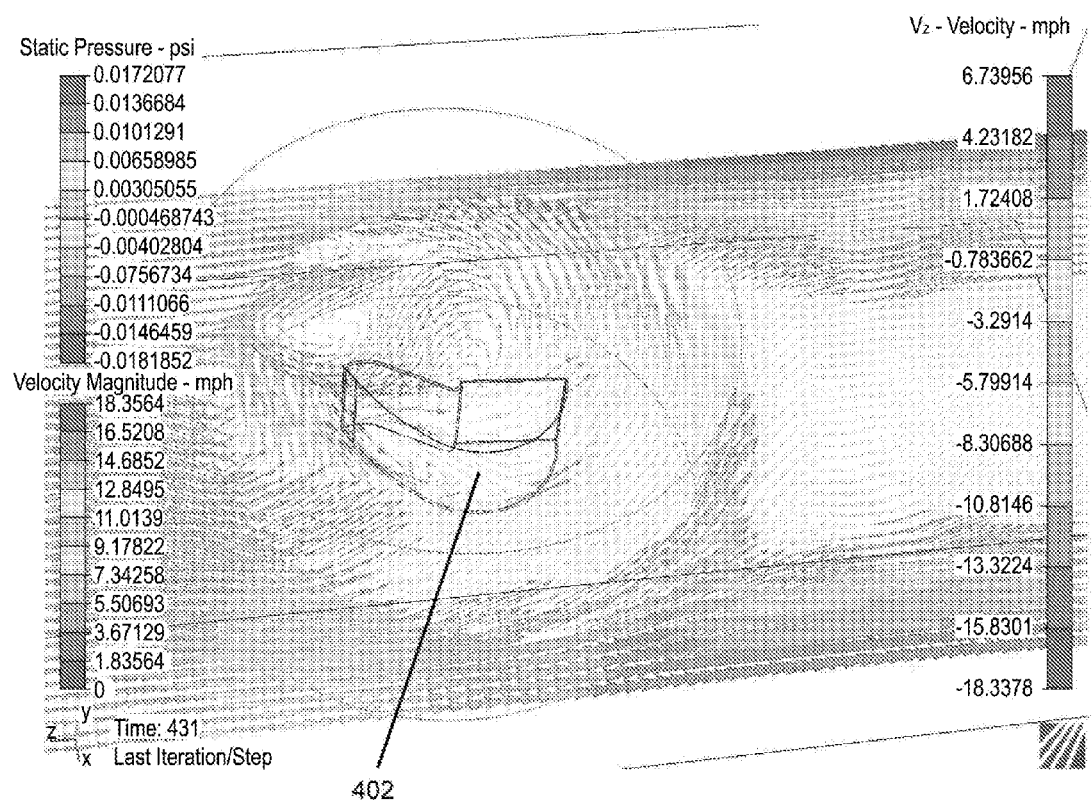
Figure 10: Rear view of turbine section.

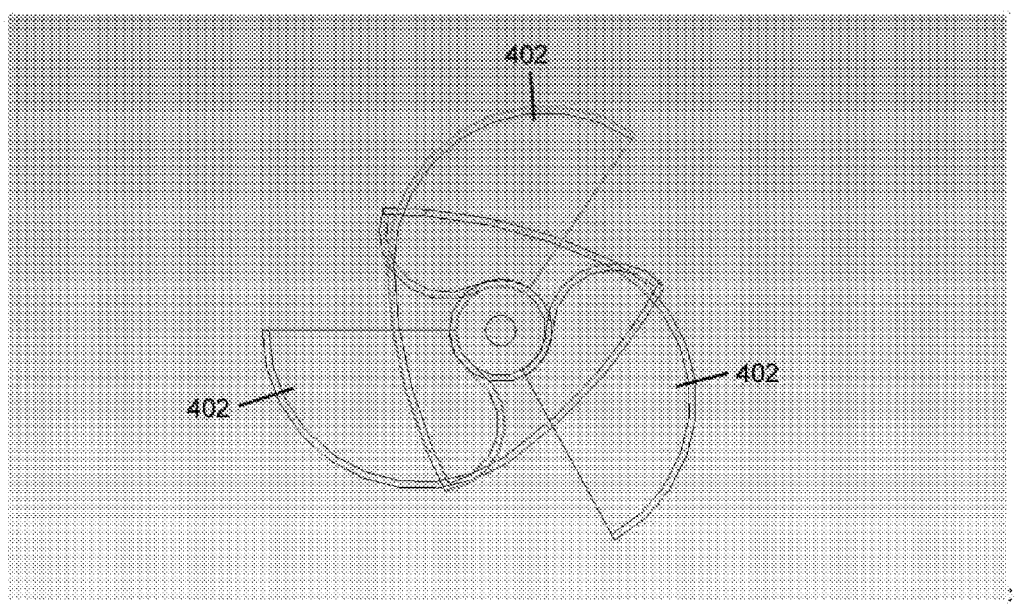
Figure 11: 120 degree arrangement of turbine sections.

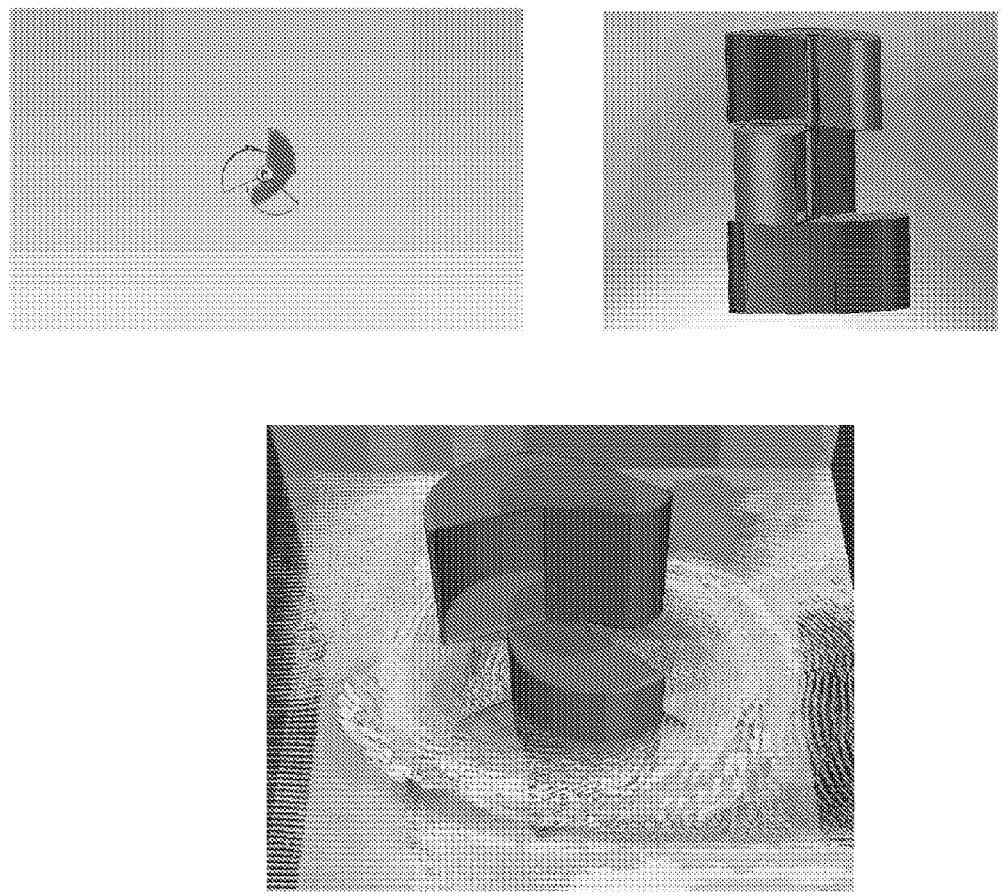
Figure 12: 3 views of tri-sectional turbine showing 120 degree relationship of each section to the others.

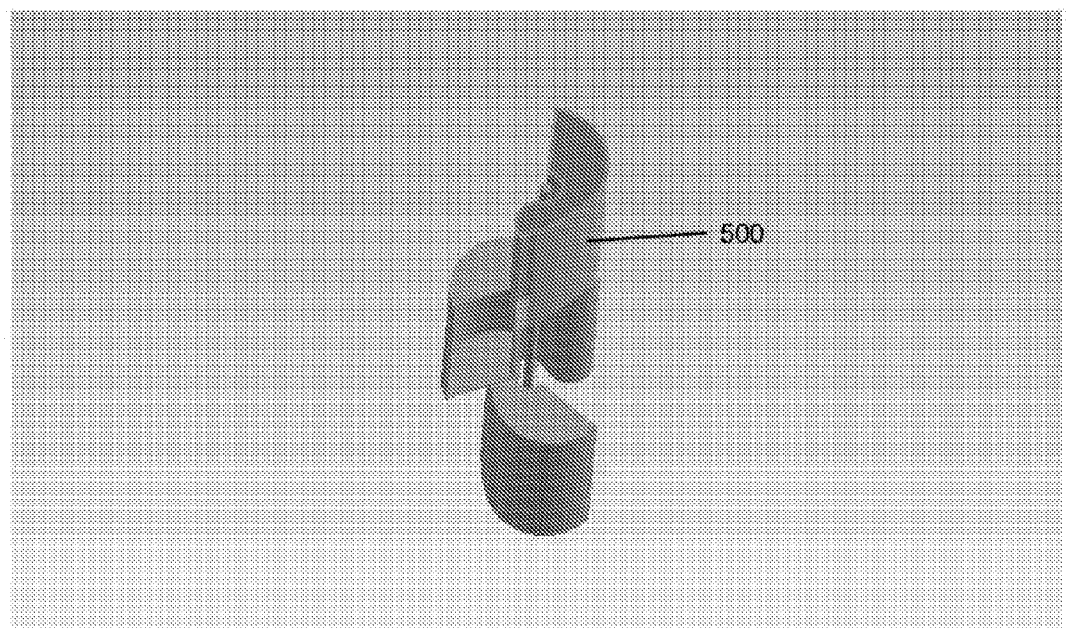
Figure 13: Solid perspective view of the turbine and drive shaft.

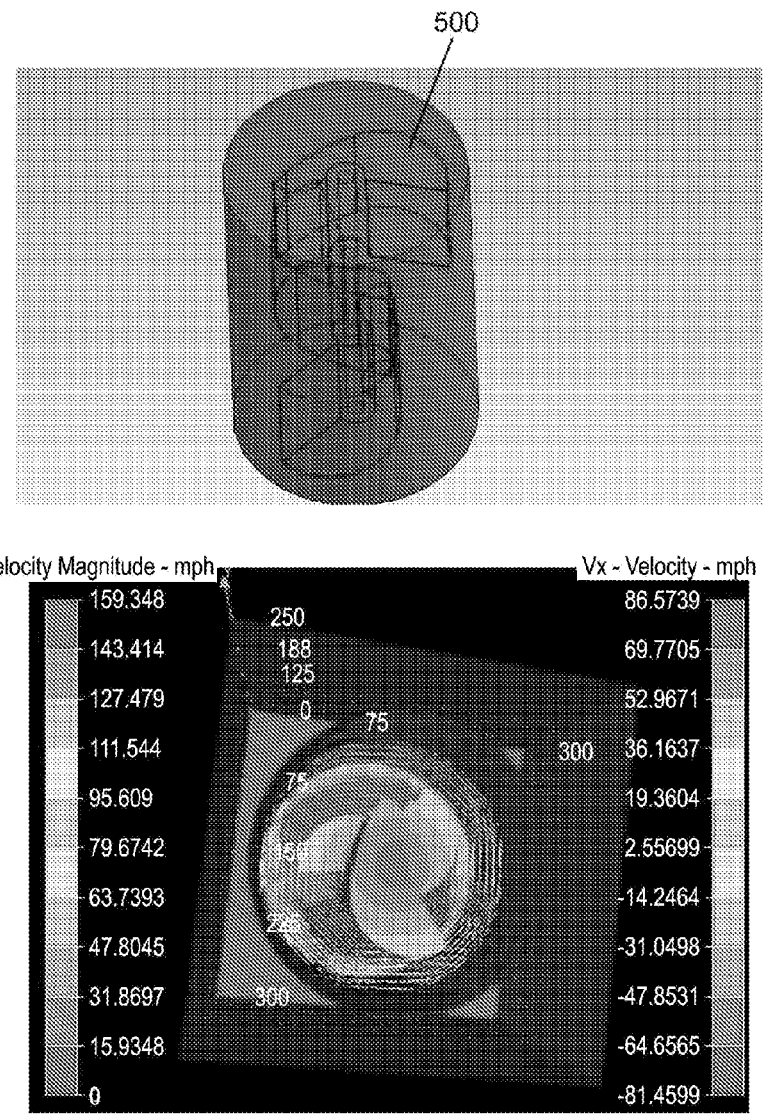
Figure 14: Perspective outline view of turbine in cylinder of rotation.

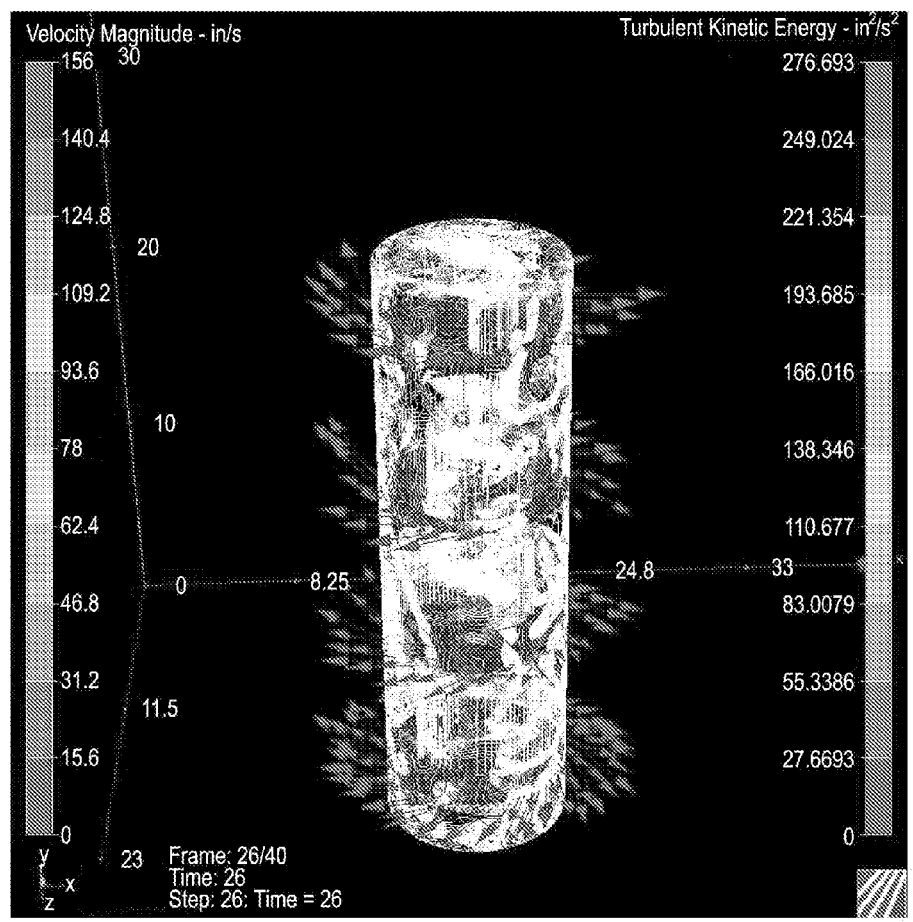
Figure 15: Rotational vectors and turbulent kinetic energy distribution in the turbine in action.

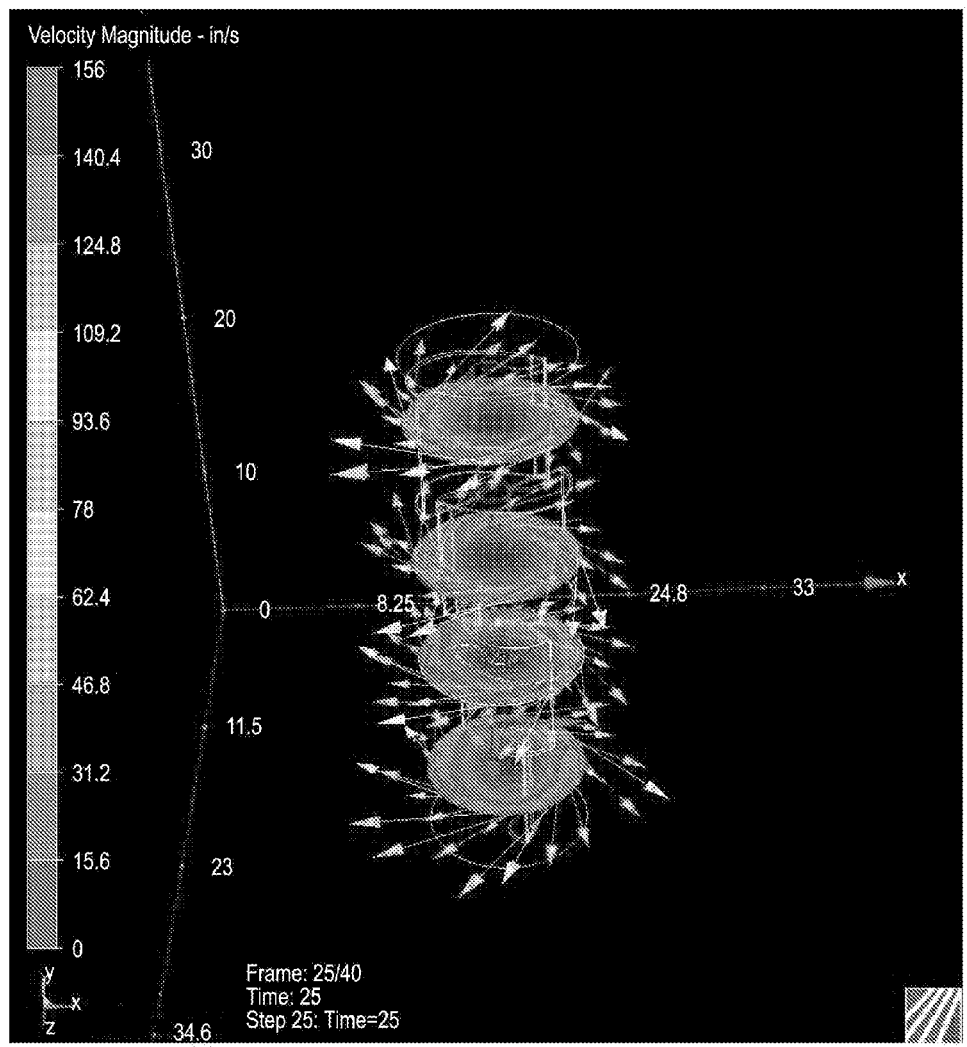
Figure 16: Velocity vectors and rotational energy distribution of turbine in action.

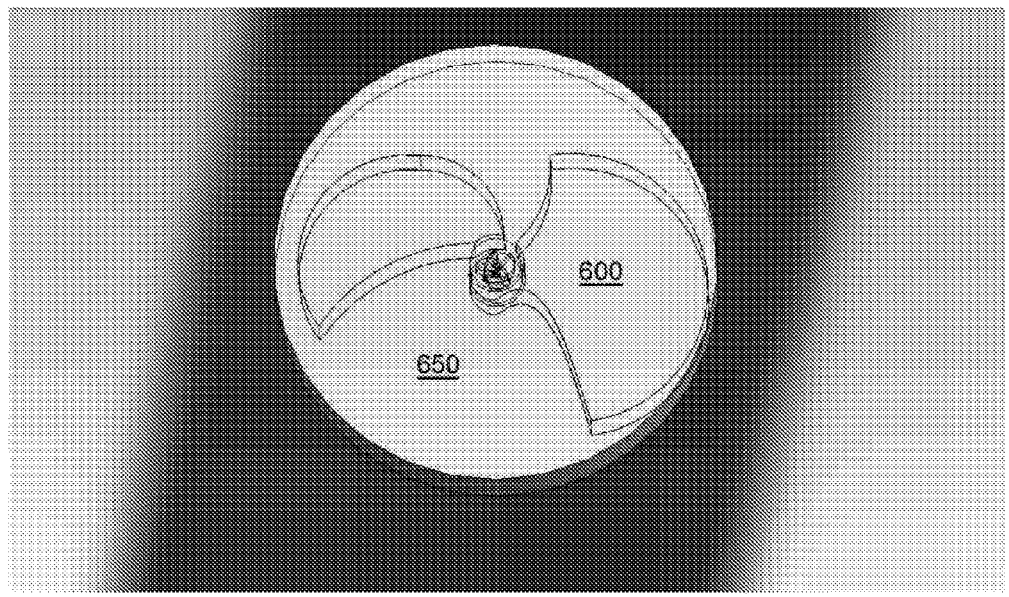
Figure 17: Turbine in concentrating funnel.

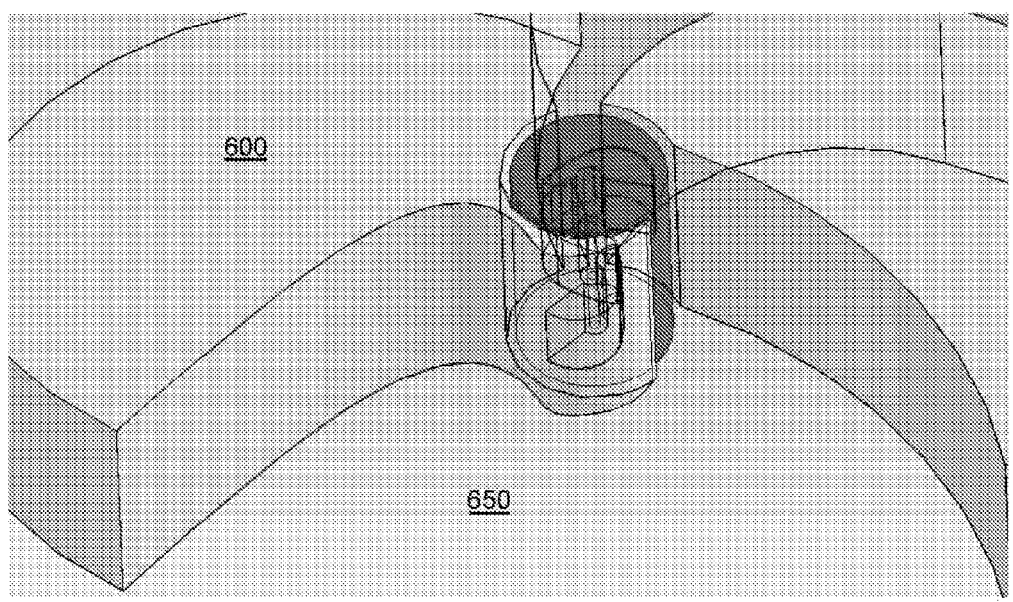
Figure 18: Detail of turbine in concentrating funnel.

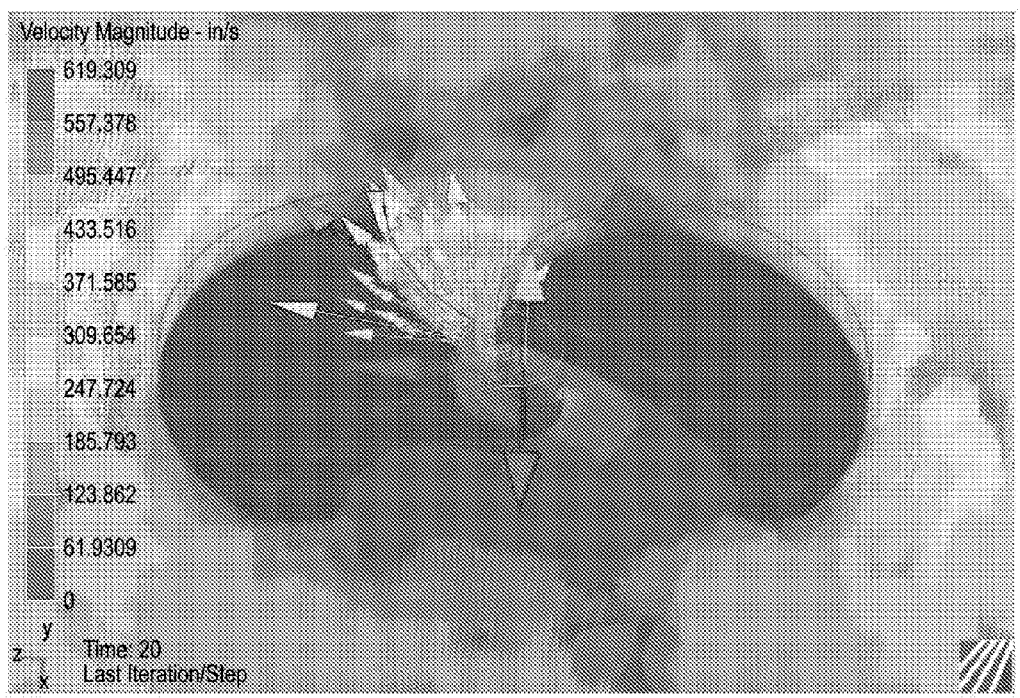
Figure 19: Energy distribution in concentrating funnel.

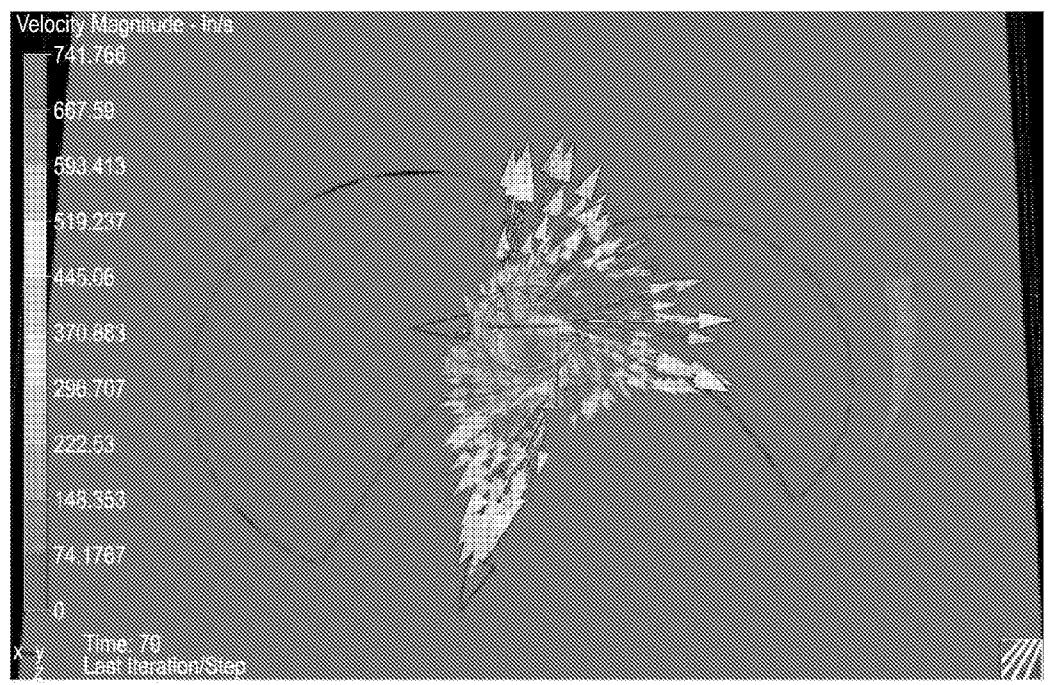
Figure 20: Velocity vectors of turbine in concentrating funnel.

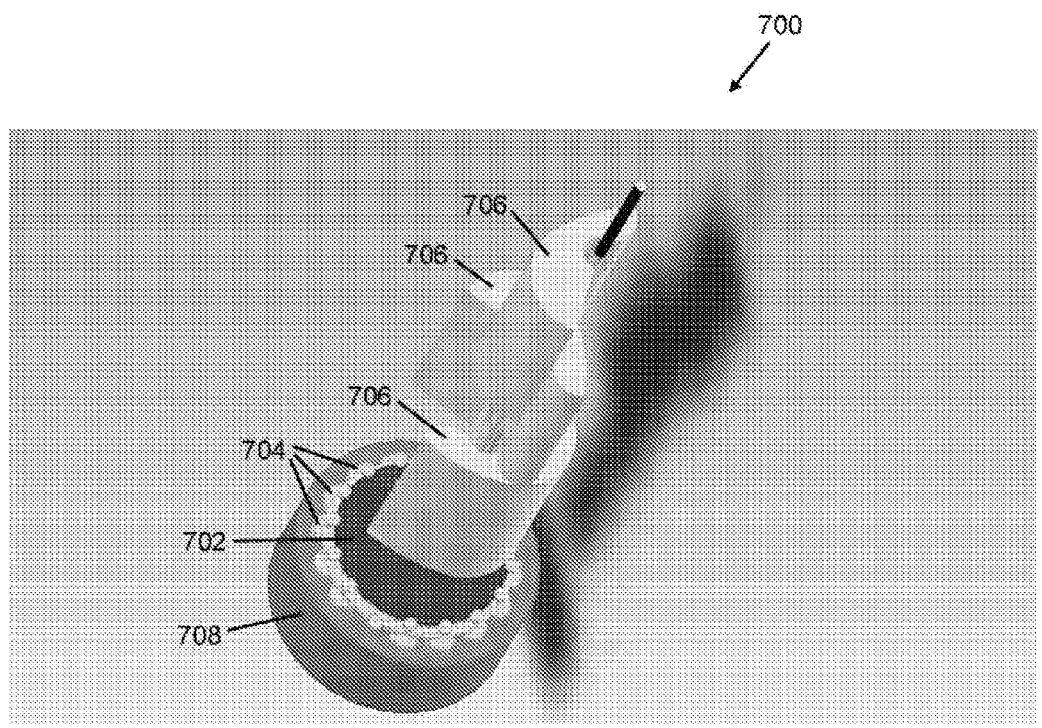
Figure 21: Perspective view of assembled turbine showing drive hub (brown), generators, turbine and base cover.

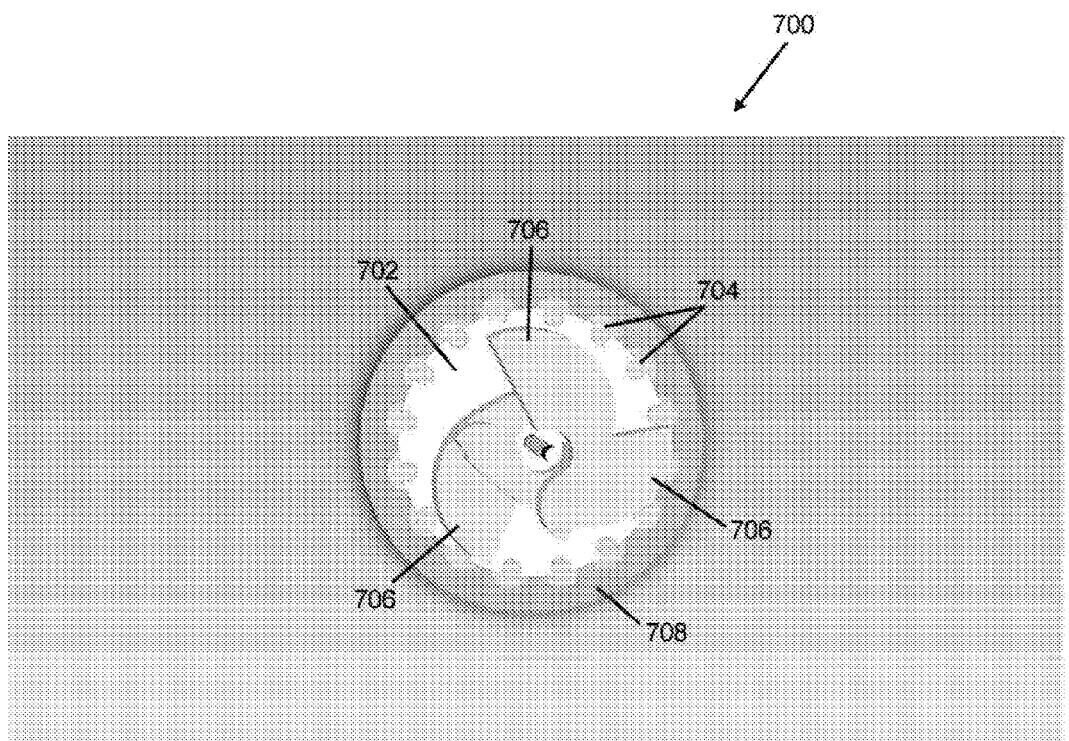
Figure 22: Top view of assembled vertical axis wind energy conversion system

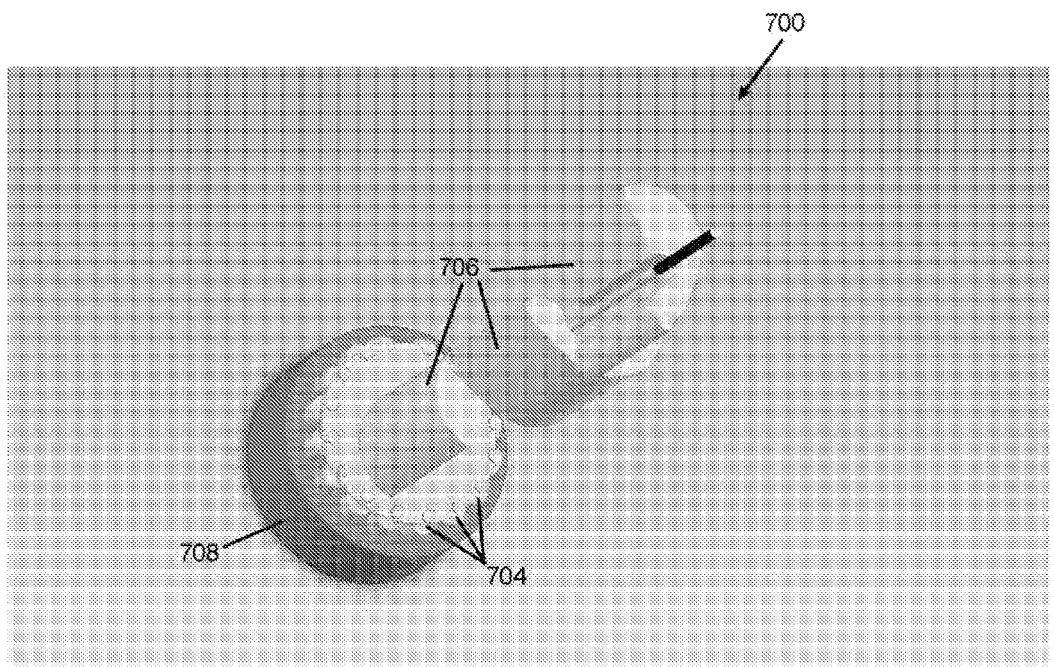
Figure 23: Vertical axis win energy conversion system showing baseplate.

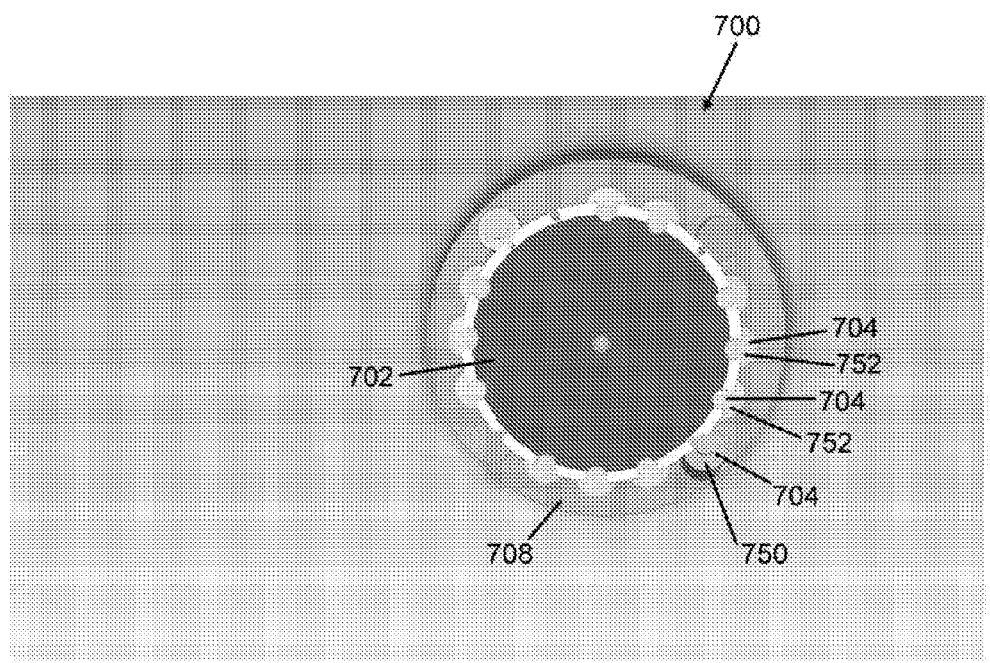
Figure 24: Showing generator pairs off-line and on-line.

VERTICAL AXIS TURBINE

CROSS-REFERENCE TO RELATED APPLICATIONS

The present patent application claims priority to U.S. provisional patent application Ser. No. 61/007,579, filed Dec. 14, 2007, which is currently pending.

FIELD OF THE INVENTION

This invention relates generally to the field of apparatuses for converting energy from flowing fluid into electricity or another power type. Moreover, it pertains specifically to an apparatus for converting wind or water energy into electricity or another form of mechanical energy.

Accordingly, the present invention provides solutions to the shortcomings of prior fluid driven turbine systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of the fluid driven turbine invention in accordance with a best mode contemplated for carrying out the conversion of energy in flowing fluid to power.

FIG. 6 illustrates a perspective view of an embodiment of a section of a turbine;

FIG. 7 illustrates the flow of air thru a section of the turbine;

FIG. 8 illustrates a top view of an embodiment of a turbine section;

FIG. 9 illustrates a front view of an embodiment of a turbine section;

FIG. 10 illustrates a rear view of an embodiment of a turbine section;

FIG. 11 illustrates an embodiment of an arrangement of turbine sections;

FIG. 12 illustrates a top view of an embodiment of a tri-sectional turbine;

FIG. 13 illustrates a perspective view of the turbine and drive shaft.

FIG. 14 illustrates a perspective outline view of an embodiment of a turbine in a cylinder of rotation;

FIG. 15 illustrates rotational vectors and turbulent kinetic energy distribution in an embodiment of a turbine in action;

FIG. 16 illustrates velocity vectors and rotational energy distribution of an embodiment of a turbine in action;

FIG. 17 illustrates an embodiment of a turbine in a concentrating funnel;

FIG. 18 illustrates a detail of an embodiment of a turbine in a concentrating funnel;

FIG. 19 illustrates energy distribution in an embodiment of a turbine in a concentrating funnel;

FIG. 20 illustrates velocity vectors of an embodiment of a turbine in a concentrating funnel;

FIG. 21 illustrates a perspective view of an embodiment of an assembled turbine;

FIG. 22 illustrates a top view of an embodiment of an assembled vertical axis wind energy conversion system;

FIG. 23 illustrates an embodiment of a vertical axis wind energy conversion system with a base; and FIG. 24 illustrates an embodiment of generators for use with an embodiment of a vertical axis wind energy conversion system.

SUMMARY OF THE INVENTION

Figure 1:
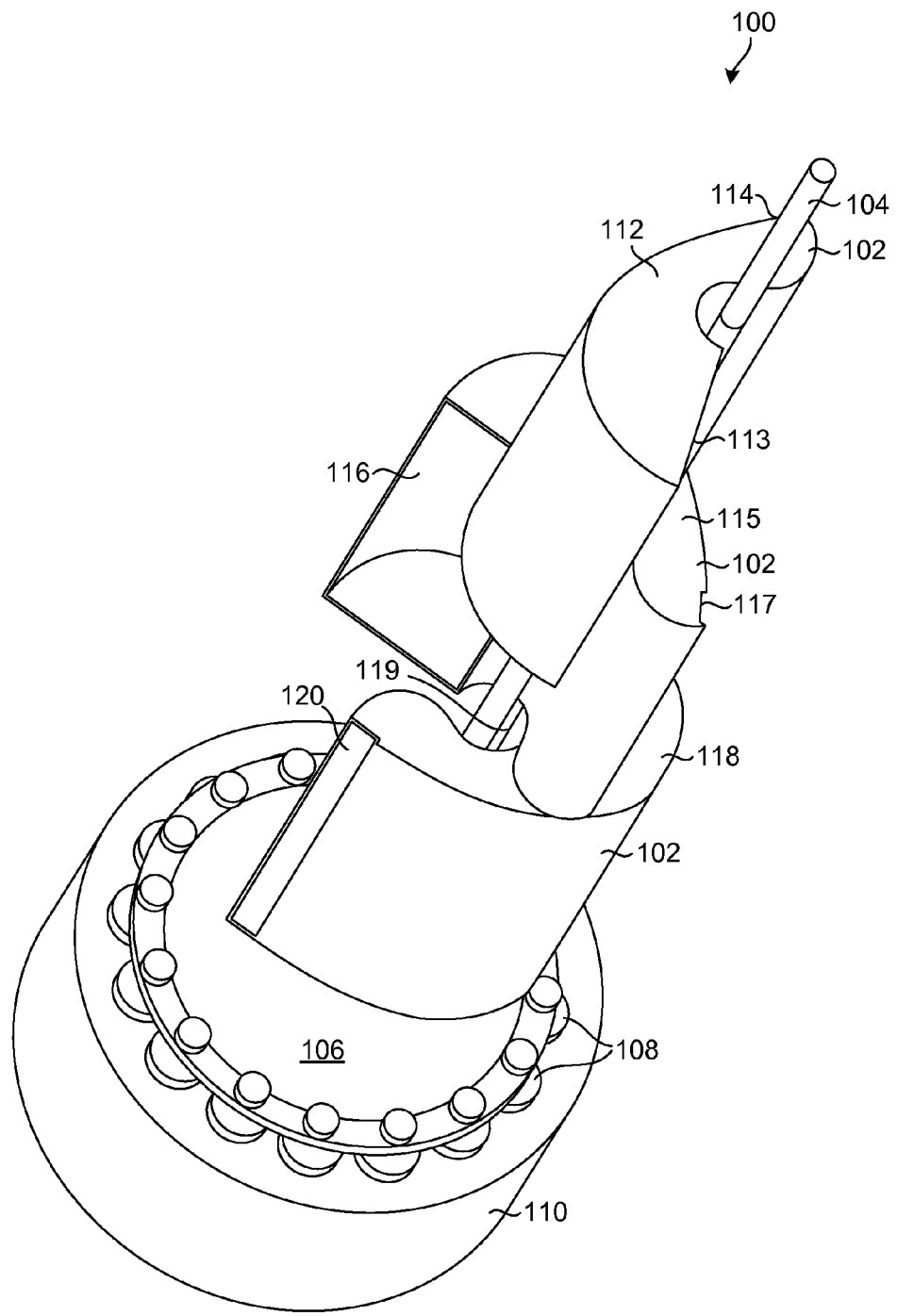
FIG. 1 illustrates a perspective view of an embodiment of a turbine.

An Aeolun Harvester fluid driven turbine includes one or more segments, a shaft, and a generator.

An embodiment of a segment for a fluid driven turbine includes four walls. The first wall is to be coupled to a shaft of a turbine, the second wall is asymmetric to the first wall and the shaft, the third wall is joined to the first and second walls, and the fourth wall is joined to the first and second walls opposite the third wall. The first, second, third and fourth walls of that segment form an inlet at a first end of the segment and an outlet is formed in at least one of the first, second, third and fourth walls.

An embodiment of the fluid driven turbine includes a shaft, a segment attached to the shaft and a generator coupled to the shaft. The segment is further comprised of a first wall coupled to the shaft, a second wall asymmetric to the first wall and the shaft, a third wall joined to the first and second walls, and a fourth wall joined to the first and second walls opposite the third wall, the first wall, the second wall, the third wall, and the fourth wall form an inlet at a first end of the segment an outlet is formed in at least one of the first wall, the second wall, the third wall, and the fourth wall at a second end of the segment.

Embodiments of the Aeolun Harvester fluid driven turbine provide a vertical-axis wind and water flow energy conversion system having a simple construction.

Embodiments of the Aeolun Harvester fluid driven turbine provide a vertical-axis wind and water energy conversion system that is more universally functional than previous wind and water flow energy conversion systems and may be deployable in various locations and environments, including rooftops, hillsides, flatlands, along the sides of highways, along riverbanks, mine shafts, oceans and rivers.

Embodiments of the Aeolun Harvester fluid driven turbine may be fabricated in such a variety of ways that they can be not aesthetically disruptive in many settings.

Embodiments of the Aeolun Harvester fluid driven turbine provide a vertical-axis wind, steam, and water flow energy conversion system that is more versatile in operation than previous wind energy conversion systems.

Embodiments of the Aeolun Harvester fluid driven turbine provide for efficient servicing because individual generators may be serviced or replaced while the system is operating.

Embodiments of the Aeolun Harvester fluid driven turbine are believed to be highly scalable in size and power output capacity. Embodiments of the Aeolun Harvester turbine are further believed to be capable of manufacture in many sizes and shapes, may be fabricated from various materials and may be fabricated in various levels of sophistication.

Embodiments of the Aeolun Harvester fluid driven turbine are believed to be able to create electricity in very low wind velocity environments, including the 1-4 mph wind velocity range frequently found in mine shafts.

Embodiments of the Aeolun Harvester fluid driven turbine are believed to be capable of functioning efficiently in turbulent airflow environments.

Embodiments of the Aeolun Harvester fluid driven turbine are believed to be capable of generating electricity from the airflow created by passing vehicles, such as automobiles and trucks on streets and highways and railroad cars on railway systems.

Embodiments of the Aeolun Harvester fluid driven turbine are believed to have a minimal environmental footprint.

Embodiments of the Aeolun Harvester fluid driven turbine are believed to be operable at slow rotational speed, thereby reducing noise, stress, and danger to humans and wildlife.

DETAILED DESCRIPTION OF THE INVENTION

Reference will now be made to embodiments of the fluid driven turbine, examples of which are illustrated in the accompanying drawings. Details, features, and advantages of the fluid driven turbine will become further apparent in the following detailed description of embodiments thereof. It is to be understood that the Figures and descriptions included herein illustrate and describe elements that are of particular relevance to the fluid driven turbine, while eliminating, for purposes of clarity, other elements found in typical turbines and turbine control systems.

Systems, apparatuses, and methods of operation of the fluid driven turbine are described herein. Aspects of those embodiments may also be included in processor based apparatuses, multi-processor based systems, and articles of manufacture that contain instructions which, when executed by a processor cause the processor to control operation of the fluid driven turbine. Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

FIG. 1 illustrates a perspective view of an embodiment of a fluid driven turbine 100. The fluid driven turbine 100 may include one or more segments 102 and the turbine 100 illustrated includes three such segments 112, 115, and 118. The fluid driven turbine 100 may further include, a shaft 104, a hub 106, one or more generators 108, and a base 110. The first segment 112 includes an inlet or mouth 113 and an outlet or discharge 114, the second segment 115 includes an inlet or mouth 116 and an outlet or discharge 117, and the third segment 118 includes an inlet or mouth 119 and an outlet or discharge 120. The segments 102 may be fixedly attached to the shaft 104 such that when the segments 102 encounter a moving fluid, the segments 102 rotate the shaft 104. The shaft 104 is fixedly attached to the hub 106 in this embodiment and the hub 106 provides a surface area of sufficient size to distribute the rotational force of the shaft 104 to a plurality of generators 108. The rotating shaft 104 and hub 106 may drive the one or more generators 108, thereby creating power, such as electrical power. In the embodiment of FIG. 1, the shaft 104 drives the generators 108 through the hub 106, which is fixedly attached to the shaft 104. It should be noted that while the hub 106 is used in this embodiment to transfer the rotational force of the shaft 104 to drive the generators 108, any alternate apparatus or method desired could be used to couple the shaft 104 to the generators 108.

The segments 102 may encounter and be driven by a variety of fluids including, for example, air moving as wind, or water moving as a tide or flowing otherwise. For example, in an embodiment, the fluid driven turbine 100 is situated such that naturally occurring wind or water flow impels the segments 102, causing the shaft 104 to rotate and, through the hub 106 in this embodiment, power the generators 108.

In an embodiment of the fluid driven turbine 100, the shaft 104 is oriented vertically. In a wind driven application, such a wind driven turbine device may be referred to as a vertical axis windmill.

Figure 2:
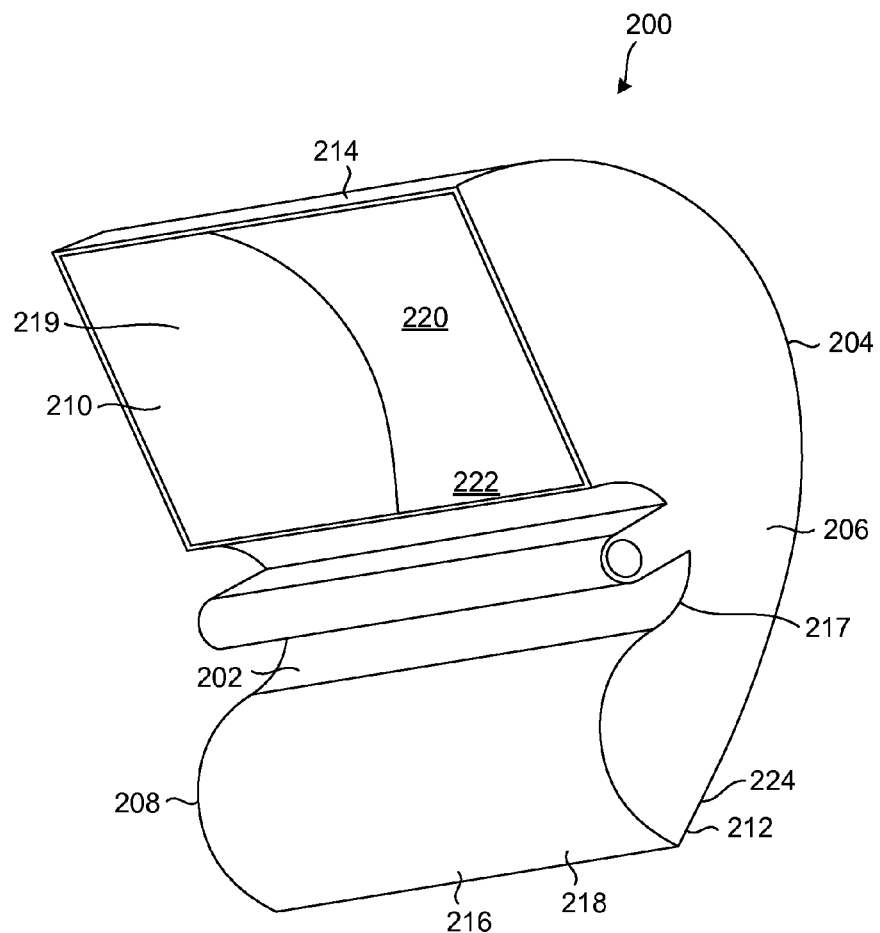
FIG. 2 illustrates a perspective view of an embodiment of a section of a turbine.

FIG. 2 illustrates a perspective view of an embodiment of a segment 200 that may be used as the segment 102 illustrated in FIG. 1. The segment 200 of that embodiment has an asymmetrical shape. The segment 200 has a first or shaft wall 202 that may be connected to a turbine shaft 104 as shown in FIG. 1, a second or distal wall 204, a third or top wall 206 that may face horizontally in a horizontal shaft application (not shown), and a fourth or bottom wall 208 that may face horizontally opposite the top wall 206 in a horizontal shaft application. A mouth or inlet 210 is formed at an inlet end 214 of the segment 200 and a discharge or outlet 212 is formed at an outlet end 216 opposite the mouth 210 of the segment 200.

The shaft wall 202 may have a cylindrical or semi-cylindrical shaped portion 217 for connection to the shaft 104. In an embodiment, segments 200 are fit around the shaft 104 via modified sleeve bearings located at the top and bottom of each segment 200. The shaft wall 202 may alternately or in addition have flat or curved 218 sections 218 as desired.

The distal wall 204 is asymmetric in relation to the shaft 104 and the shaft wall 202 of the segment 200. The distal wall 204 is curved such that it is farthest from the shaft wall 202 at the inlet end 214 of the segment 200 and closest to the shaft wall 202 near the outlet end 216 of the segment 200. As may be seen in FIG. 2, the distal wall 204 may be connected directly to the shaft wall 202 at the outlet end 216.

Thus, the distance between the shaft wall 202 and the distal wall 204 is greatest at the inlet end 214 where the fluid enters the segment 200 and the distance between the shaft wall 202 and the distal wall 204 is less at the outlet end 216. In the embodiment illustrated in FIG. 2, the distance between the shaft wall 202 and the distal wall 204 widens in one or more sections between the inlet end 214 and the outlet end 216. In other embodiments, such as the embodiment shown in FIGS. 3-5, the distance between the shaft wall 302 and the distal wall 304 reduces continuously from the inlet end 314 to the outlet end 316.

The top wall 206 and bottom wall 208 attach to each of the shaft wall 202 and the distal wall 204 to form a channel 219 through which fluid driving the segment 200 flows and may otherwise be arranged as desired. In the embodiment illustrated in FIG. 2, the top wall 206 and bottom wall 208 are arranged parallel to one another. Such an arrangement causes the cross-sectional area of the segment 200 to be greatest at the inlet end 214 and smallest at the outlet end 216 where the distal wall 204 approaches the shaft wall 202. In an embodiment, the cross-sectional area of the channel 219 continuously reduces from the inlet end 214 to the outlet end 216. That continuous reduction may be at the same or a differing rate.

All or a portion of the distal wall 204 may be formed in the shape of a logarithmic spiral. In one embodiment, the logarithmic spiral extends in a first portion 220 from the mouth 210 of the segment 200 for a distance toward the outlet end 216. Fluid flowing into the mouth 210 of the segment 200 may apply a drag force to the first portion 220 of the segment 200 where the distal wall 204 is in the shape of a logarithmic spiral lying beyond the mouth 210.

In an embodiment, a second portion 222 of the distal wall 204 is flattened toward the shaft wall 202. That formation may create a lift force to the segment 200 in the second portion 222 when fluid flow is applied to that second portion 222.

In an embodiment, a third portion 224 of the distal wall 204 includes the discharge 212. As fluid moves from the mouth through the segment 200, the fluid may become pressurized due to the reduced area at the outlet end 216 of the segment 200 and that pressurized fluid exits the segment 200 through the discharge 212. Moreover, the discharge 212 through which the fluid exits may be smaller than the mouth 210 through which the fluid entered. Thus, a jet force may be applied by the fluid in the third portion 224 of the segment 200 as the fluid exits through the discharge 212.

It may therefore be seen that a fluid, such as water or air, flowing through the segment 200 may apply one or more forces on the segment 200. For example, in an embodiment of the segment 200 a fluid entering the mouth 210 of the segment 200 may apply a drag force on the portion 220 of the segment 200 nearest the mouth 210, the same fluid may further impart a lift force on the portion 222 of the segment 200 as it passes through the segment 200 away from the mouth 210, and the same fluid may also impart a jet force on the portion 224 of the segment 200 as it leaves the segment 200 at the discharge 212.

In an embodiment, a logarithmic spiral was extruded to create a segment 102 of the fluid driven turbine 100, such that air flowing through and around the segment 102 would produce drag from the inlet extending into a first portion of the segment 102, lift in a second portion of the segment 102 extending from the first portion of the segment 102, and jet force at the outlet due to the outlet being smaller than the inlet. Air flowing through the segment 102 of that embodiment is forced to accelerate due to the progressively smaller cross-section of the segment 102 from the inlet to the outlet, creating the jet force at the outlet. Accordingly, each of those three forces contributes to the rotation of each segment 102 so formed.

The segment 200 may be formed of any desired material, such as, for example, a weather resistant metal. Where the segment 200 is intended to be impelled by wind, the segment 200 may be formed of a somewhat rigid, durable material. Where the segment 200 is intended to be impelled by water, the segment 200 may be formed of an even more rigid, durable material. Embodiments of wind turbines may, for example, be constructed of carbon-fiber Kevlar weave, various plastics, and high grade aluminum.

Referring again to FIG. 1, any desired number of segments 102 may be employed in embodiments of the fluid driven turbine 100. Those segments 102 may furthermore be set symmetrically around the shaft 104 to create a fairly steady turbine speed in a constant speed wind or other fluid flow.

For example, embodiments of turbines may be created with segments 102 in various multiples of three up to twelve segments 102 attached to the shaft 104 such that the shaft 104 rotates when a fluid flows into the segments 102. When three segments 112, 115, and 118 are employed, they may be set at 120° angles from one another such that the inlets 113, 116, and 119 of the segments 112, 115, and 118 are offset by 120° from one another.

When multiple sets of three segments 102 are used, each set of three segments 102 may be set at 120° angles from one another. When one or more sets of six segments 102 are used, each set of six segments may be set at 60° angles from one another. Thus, in any embodiment in which two or more segments 102 are used in a set, the segments 102 of that set may be attached to the shaft 104 such that an angle between any one segment 102 and any other two segments 102 of the set facing in most nearly the same direction are equal (i.e., segments 102 are set at 60° angles or 120° angles from one another). When multiple sets of segments are used, the segments 102 of each set may be set at equal angles, one from another, and angles from set to set may be repeated or offset as desired.

Thus, for example, where a first segment 112 has a first mouth 113, a second segment 115 has a second mouth 116 and a third segment 118 has a third mouth 119, the first segment 112, the second segment 115, and the third segment 118 may be attached to the shaft 104 such that an angle between the first mouth 113 and the second mouth 116 is equal to an angle between the first mouth 113 and the third mouth 119. Moreover, an angle between the second mouth 116 and the third mouth 119 may also be equal to the angles between the first mouth 113 and the second mouth 116 such that the segments 112, 115, and 118 are symmetrical around the shaft 104.

An embodiment of the fluid powered turbine 100 may be created for wind operation. The fluid powered turbine 100 embodiment illustrated in FIG. 1 includes three vertically stacked, repeating segments 112, 115, and 118 set at 120° each from the other in an equilateral arrangement. Each section 112, 115, and 118 is comprised of an asymmetrical, thin-walled, hollow body with a large air intake opening 113, 116, and 119 and a smaller air outlet opening 114, 117, and 120 and the effect of air flowing through those segments 112, 115, and 118 is the compression and acceleration of airflow through the segments 112, 115, and 118, creating a jet of compressed, accelerated air exiting the smaller air outlet opening 114, 117, and 120. The outlet may be strategically placed to impart rotational propulsion to each section 112, 115, and 118 around the off-center axis of the shaft 104. The behavior of this fluid powered turbine 100 results at least in part from the shape and design of the sections 112, 115, and 118, is independent of scale, and may be constructed of a variety of light and strong materials. Accordingly, the fluid powered turbine 100 is believed to be highly scalable in size and power output capacity.

That embodiment of the fluid powered turbine 100 also includes a drive train arrangement, consisting of a large, circular hub 106 which is driven by the rotation of the segments 112, 115, and 118 attached to the shaft 104. The hub 106 contacts and drives multiple diametrically opposed pairs of electric generators 108, equally spaced along its circumference. In that embodiment, each pair of generators 108 can be engaged in an "on" position or disengaged in an "off" position. When a pair of generators 108 is engaged, that pair of generators 108 creates energy from the rotation of the turbine shaft 104 and when a pair of generators 108 is disengaged, that pair of generators 108 does not create energy from the rotation of the turbine shaft 104. That arrangement may provide benefits including aiding operation of the fluid powered turbine 100 by engaging only as many generators 108 as the fluid flow powering the fluid powered turbine 100 is sufficient to operate and maintaining the speed of rotation of the fluid powered turbine 100 in a desirable range. Thus, for example, in conditions of light wind where low torque is being applied to a wind driven fluid powered turbine 100, the number of generators 108 being driven by the fluid powered turbine 100 may be just two, and as wind velocity increases and fluid powered turbine 100 rotation increases, additional pairs of generators 108 may be moved to the "on" position, increasing the amount of electricity generated by the fluid powered turbine 100. In addition, by engaging additional pairs of generators 108 as the wind velocity increases, and as the electricity generated increases, the system may be effectively "loaded" and, as a consequence, braked. That natural braking mechanism prevents the fluid powered turbine 100 from spinning excessively fast under higher wind velocities.

Generators 108 may be engaged and disengaged using various systems and methods. For example, a mechanical centrifugal governor (not shown) may be used to engage one or more additional generators 108 at a predetermined speed as the speed of the fluid powered turbine 100 increases. Similarly, the one or more additional generators may be disengaged when the speed of the fluid powered turbine 100 decreases below the same or a different predetermined speed. Alternately, an embedded microcontroller based system (not shown) may read wind velocity or acceleration of the fluid powered turbine 100 and move one or more generators 108 online and offline in response to increases and decreases in wind velocity or acceleration. It should be recognized that any number of generators 108 may be used with the turbine 100 and any number of generators 108 may be engaged or disengaged at a time.

In another embodiment, a vertical-axis wind energy conversion system is provided that is a hollow bodied fluid powered turbine 100 design that includes three sections 102, each oriented 120° away from the other. The sections 102 are attached to a vertically placed central drive shaft 104, which descends to a circular hub 106, around the circumference of which are multiple pairs of diametrically opposed electrical generators 108. Those generators 108 can be moved in and out of contact with the drive hub 106 in response to wind velocity and rotational speed of the fluid powered turbine 100. The on/off control of these paired generators 108 may be accomplished by electronic, pneumatic or mechanical means. The dual effects of the on/off switching of generator 108 pairs may be to simultaneously maximize the electrical output of the system while providing a braking mechanism to restrain the rotational speed of the fluid powered turbine 100. In those conditions where it is deemed desirable, the concentrating funnel 650 described herein may be implemented to improve the efficiency of the system.

Figure 3:
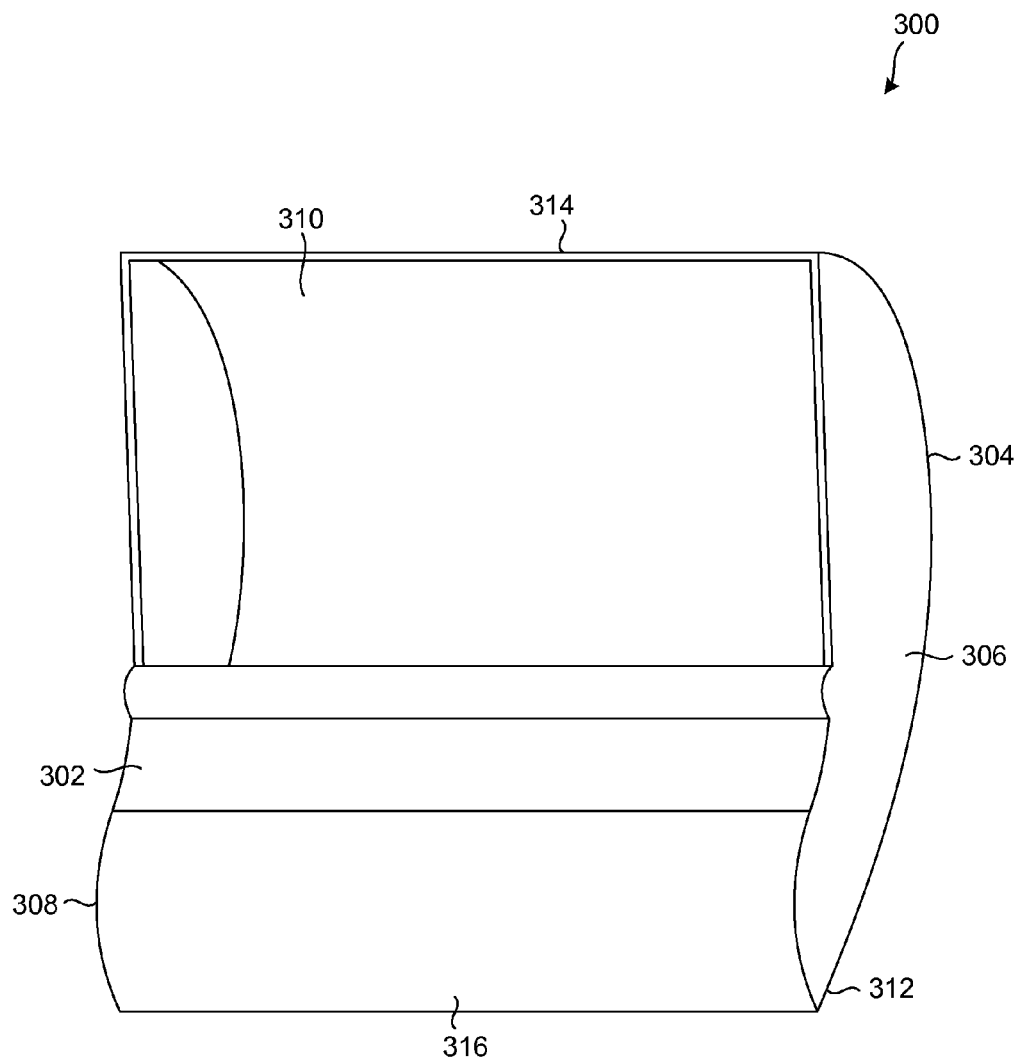
FIG. 3 depicts a perspective front view of another embodiment of a section of a turbine.
Figure 4:
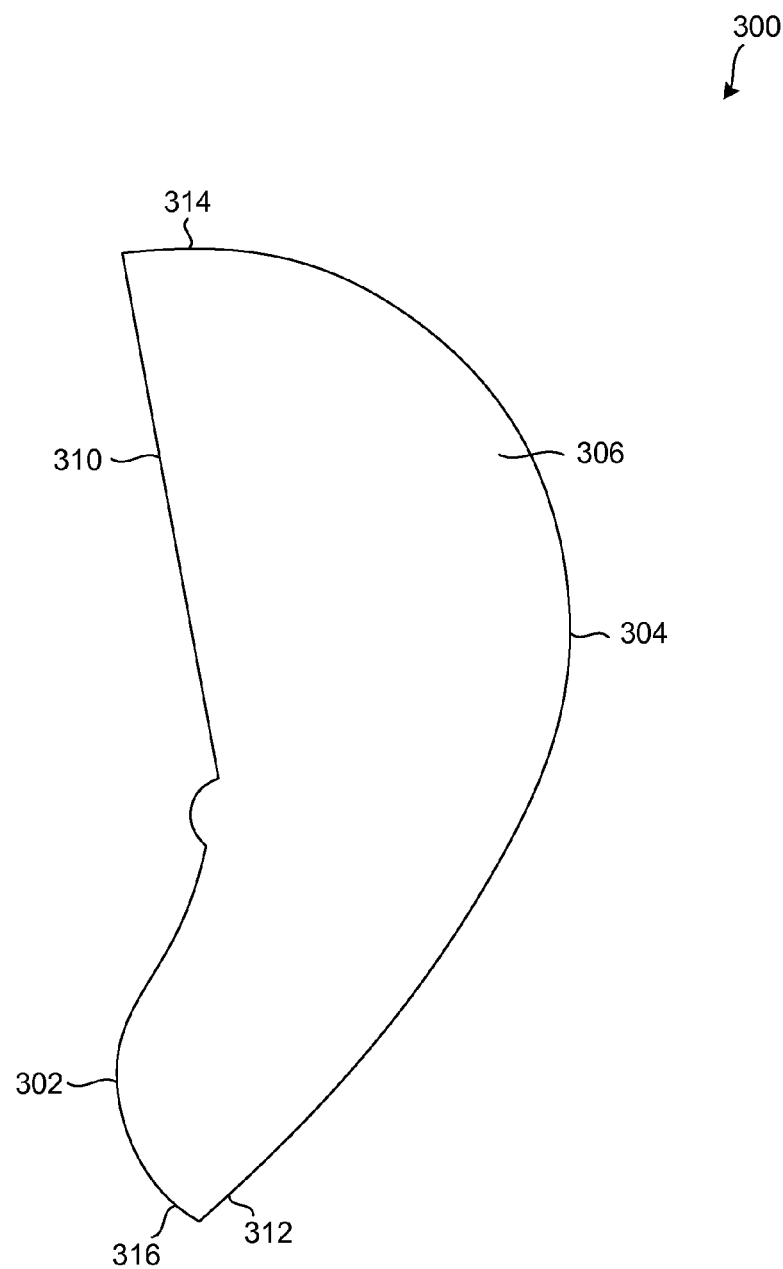
FIG. 4 depicts a side view of the embodiment of the section of the turbine shown in FIG. 3.
Figure 5:
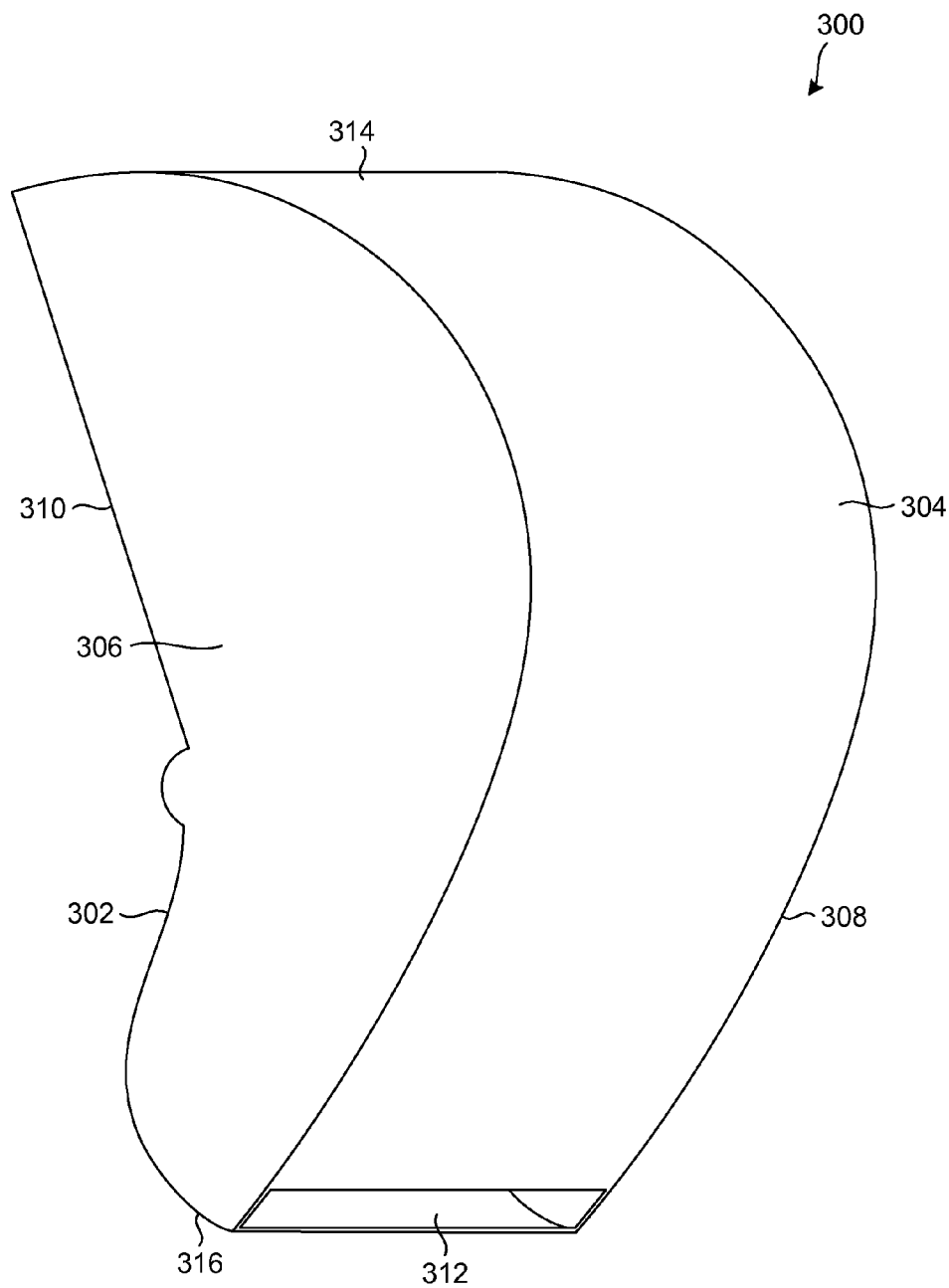
FIG. 5 depicts a perspective rear view of the embodiment of the section of the turbine shown in FIGS. 3 and 4.

FIGS. 3-5 illustrates another embodiment of a segment 300 for a fluid driven turbine 100. FIG. 3 shows a front perspective view of the segment 300, which includes a first or shaft wall 302 that may be connected to a turbine shaft 104 as shown in FIG. 1, a second or distal wall 304, a third wall 306, and a fourth wall 308 opposite the third wall. A mouth or inlet 310 is formed at an inlet end 314 of the segment 300 and a discharge or outlet 312 is formed at an outlet end 316 opposite the mouth 310 of the segment 300.

FIG. 4 illustrates a wall view of the segment of FIG. 3. In the embodiment of FIGS. 3-5, the distal wall 304 continuously approaches the shaft wall 302 as they approach the outlet end 316. Thus the distance between the distal wall 304 and the shaft wall 302 becomes continuously less. Additionally, the third wall 306 and the fourth wall 308 are parallel such that the area of the segment 300 continuously reduces from the mouth 310 to the outlet end 316 of the segment 300.

FIG. 5 illustrates a back perspective view of the segment 300. It may be noted that the distal wall 304 of the segment illustrated in FIGS. 3-5 is asymmetric in relation to the shaft 104 and the shaft wall 302 of the segment 300. It may also be seen that, in this embodiment, the outlet 312 is formed in the distal wall 304 of the segment 300 near where the distal wall 304 meets the shaft wall 302.

Embodiments of the fluid driven turbine 100 are thought to have wide functionality, from generating electricity on a conventional electrical grid, to providing electricity to a single home or building, to providing an active recharging system for a hybrid-electric or electric automobile while the vehicle is in motion or parked.

FIGS. 6 and 7 illustrate a segment 402 of an embodiment of a vertical-axis wind energy conversion system. Three turbine segments 402 may be attached to a shaft 404 in that embodiment. Each segment 402 has a hollow body 430 that forms a narrowing tunnel 432 and has a large opening 434 to receive air flow at its inlet end 410 and a smaller opening 436 at the opposite, outlet end 412 through which airflow is discharged. Air received in a segment 402 is compressed against the rear wall 438 inside the large opening 434 of the hollow body 430 and flows through the narrowing tunnel 432, being further compressed and accelerated as it travels through the segment 402. As a result, pressure from the compressed air generates a force creating torsion on that section 402 of the turbine 400, causing the section 402 of the turbine 400 to rotate. Additionally, compressed accelerated air flows out of the turbine section 402 through a discharge 436 tangentially to the circumference of rotation, creating a propulsive force and causing the section 402 to rotate as well.

FIGS. 8, 9, and 10 show top, front, and rear views of a section 402 described in the embodiment of FIGS. 6 and 7.

FIG. 11 shows an outline drawing of the three sections 402 stacked together, each rotated by 120°.

FIG. 12 shows a solid top view, side view, and perspective view of the three sections stacked together, each rotated by 120°.

FIG. 13 shows a perspective view of an embodiment of a fluid driven turbine 500.

FIG. 14 shows an outline of the turbine 500 of FIG. 13 in its cylinder of rotation. The cylinder of rotation is the cylindrical shaped area swept out by the motion of the rotating turbine (i.e. when it rotates, the outer edge of the turbine sweeps out a circle which, stretched upwards in three dimensions forms a cylinder). The cylinder of rotation may alternately be referred to as the "swept area" of the turbine.

FIG. 15 illustrates rotational vectors of motion of the turbine and the turbulent kinetic energy distribution of the turbine 500 of FIG. 13 in action.

FIG. 16 illustrates velocity vectors of motion of the turbine 500 of FIG. 13 and the rotational kinetic energy distribution of the turbine 500 of FIG. 13 in action.

FIGS. 17 and 18 illustrate a turbine 600 used in conjunction with a concentrator funnel 650. FIG. 17 illustrates an embodiment of a turbine 600 in a concentrating funnel 650. In certain embodiments for certain environments, the turbine 600 may be contained in a concentrating funnel 650, which collects, concentrates, and accelerates the flow of air onto the turbine 600. That may in turn increase the electricity output of the turbine 600 under low velocity wind conditions.

FIG. 18 shows a close-up detail of an embodiment of a turbine 600 in a concentrating funnel 650. Where deployment conditions permit, i.e. there is sufficient space, and wind flow is highly variable, or consistently low, a concentrator funnel 650 may be used to enclose the turbine 600. This concentrator funnel 650 may be constructed on a rotating plate (not shown) or "lazy-Susan," allowing it to be oriented into the wind to maximize the flow of the wind onto the turbine 600. In conditions of higher airflow and lesser wind variability, the concentrator funnel 650 may not be employed.

FIG. 19 shows the energy distribution of the turbine 600 in the concentrating funnel 650.

FIG. 20 shows velocity vectors indicating energy distribution of the turbine 600 in the concentrating funnel 650.

FIG. 21 provides a perspective view of an embodiment of an assembled vertical axis wind energy conversion system 700 showing a drive hub 702, generators 704, segments 706, and a base 708.

FIG. 22 illustrates a top view of the embodiment of the assembled vertical axis wind energy conversion system 700 illustrated in FIG. 21.

FIG. 23 is another perspective view of the embodiment of the assembled vertical axis wind energy conversion system 700 of FIGS. 21 and 22.

FIG. 24 shows a top view of the vertical axis wind energy conversion system 700 with the segments 706 removed. In FIG. 24, certain of the generators 704 are depicted in a disengaged or off-line position 750 and other generators 704 are depicted in an engaged or on-line position 752.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A segment for a fluid driven turbine, comprising:
a first wall to be coupled to a shaft;
a second wall asymmetric to the first wall and the shaft, having a first portion that creates a drag force when fluid moves along the first portion of the second wall, and a second portion flattened toward the first wall that creates a lift force when fluid moves along the second portion of the second wall;
a third wall joined to the first and second walls; and
a fourth wall joined to the first and second walls opposite the third wall; the first, second, third and fourth walls forming an inlet at a first end of the segment; and
the first, second, third and fourth walls having an outlet opening formed therein at a second end of the segment where fluid moving through the segment exits the segment and at which a jet force is created as the fluid exits the segment, the segment having its smallest cross-sectional area at the outlet opening.

2. The segment of claim 1, wherein the first wall is separated from the second wall by the outlet opening.

3. The segment of claim 1, wherein a distance between the first wall and the second wall is continuously reduced from the inlet to the outlet opening.

4. The segment of claim 1, wherein a distance between the first wall and the second wall is less at the outlet opening than at the inlet.

5. The segment of claim 1, wherein at least a portion of the second wall is formed in the shape of a logarithmic spiral.

6. The segment turbine of claim 5, wherein the portion of the second wall formed in the shape of a logarithmic spiral is the portion of the second wall that extends from the inlet.

7. A turbine comprising:
a shaft;
a segment attached to the shaft and including:
a first wall coupled to the shaft;
a second wall asymmetric to the first wall and the shaft, having a first portion that creates a drag force when fluid moves along the first portion of the second wall, and a second portion flattened toward the first wall that creates a lift force when fluid moves along the second portion of the second wall;
a third wall joined to the first and second walls; and
a fourth wall joined to the first and second walls opposite the third wall;
the first wall, the second wall, the third wall, and the fourth wall forming an inlet at a first end of the segment and having an outlet opening formed in the first wall, the second wall, the third wall, and the fourth wall at a second end of the segment where fluid moving through the segment exits the segment and at which a jet force is created as the fluid exits the segment, the segment having its smallest cross-sectional area at the outlet opening; and
a generator coupled to the shaft.

8. The turbine of claim 7, further comprising a base supporting the shaft and the generator.

9. The turbine of claim 7, wherein the shaft is coupled to the generator through a hub coupled to the shaft and the generator.

10. The turbine of claim 9, further comprising a plurality of generators, wherein at least one of the generators is disengagable from the hub.

11. The turbine of claim 10, wherein the at least one disengageable generator is disengaged from the hub when the speed of the turbine decreases below a predetermined speed.

12. The turbine of claim 10, wherein the at least one disengageable generator is engaged with the hub when the speed of the turbine increases above a predetermined speed.

13. The turbine of claim 7, wherein the drag force is applied near the inlet of the segment, and the lift force is applied between the inlet and the outlet opening of the segment.

14. The turbine of claim 7, further comprising:
a second segment; and
a third segment wherein the segment, the second segment and the third segment are attached to the shaft.

15. The turbine of claim 14, wherein the segment, the second segment and the third segment are attached symmetrically around the shaft.

16. The turbine of claim 15, wherein the segment has a first mouth, the second segment has a second mouth and the third segment has a third mouth and wherein the segment, the second segment, and the third segment are attached to the shaft such that an angle between the first mouth and the second mouth is equal to an angle between the first mouth and the third mouth.

17. A segment for a fluid driven turbine, comprising:
a channel comprising an inlet end and an outlet end opening, the outlet end opening where fluid moving through the segment exits the segment, the cross-sectional area of the channel continuously reducing from the inlet end to the outlet end opening, the channel having a first portion that creates a drag force when fluid moves through the first portion, a second portion that creates a lift force when fluid moves through the second portion, and a third portion that creates a jet force at the outlet end opening as the fluid exits the segment.

18. The segment of claim 17, the channel comprising a top wall and a bottom wall, the top wall parallel to the bottom wall.

* * * * *